(12) United States Patent
Jung et al.

(10) Patent No.: US 7,287,421 B2
(45) Date of Patent: Oct. 30, 2007

(54) SEMICONDUCTOR PROBE WITH HIGH RESOLUTION RESISTIVE TIP AND METHOD OF FABRICATING THE SAME

(75) Inventors: Ju-hwan Jung, Seoul (KR); Jun-soo Kim, Seoul (KR); Hyung-cheol Shin, Seoul (KR); Seung-bum Hong, Seongnam-si (KR)

(73) Assignees: Samsung Electronics Co., Ltd., Gyeonggi-do (KR); Seoul National University Industry Foundation, Seoul (KR)

( * ) Notice: Subject to any disclaimer, the term of this patent is extended or adjusted under 35 U.S.C. 154(b) by 0 days.

(21) Appl. No.: 11/482,690

(22) Filed: Jul. 10, 2006

(65) Prior Publication Data

US 2007/0051169 A1 Mar. 8, 2007

(30) Foreign Application Priority Data

Sep. 3, 2005 (KR) .................. 10-2005-0081996

(51) Int. Cl.
*G01R 31/02* (2006.01)
(52) U.S. Cl. .................... 73/105; 324/761
(58) Field of Classification Search ........... 73/105; 324/761
See application file for complete search history.

(56) References Cited

U.S. PATENT DOCUMENTS

| 5,021,364 | A  | * | 6/1991  | Akamine et al. | ........... 250/306 |
| 2006/0060779 | A1 | * | 3/2006  | Park et al. | .................. 250/309 |
| 2006/0157440 | A1 | * | 7/2006  | Jung et al. | ..................... 216/2 |
| 2006/0252172 | A1 | * | 11/2006 | Park et al. | .................... 438/48 |

FOREIGN PATENT DOCUMENTS

KR    10-2004-0088631 A    10/2004

* cited by examiner

*Primary Examiner*—Robert Raevis
(74) *Attorney, Agent, or Firm*—Sughrue Mion Pllc.

(57) ABSTRACT

A semiconductor probe with a high-resolution tip and a method of fabricating the same are provided. The semiconductor probe includes: a cantilever doped with a first impurity; a resistive convex portion projecting from an end portion of the cantilever and lightly doped with a second impurity opposite in polarity to the first impurity; and first and second electrode regions formed on either side of the resistive convex portion and heavily doped with the second impurity.

8 Claims, 9 Drawing Sheets

SEMICONDUCTOR PROBE WITH HIGH RESOLUTION RESISTIVE TIP AND METHOD OF FABRICATING THE SAME

CROSS-REFERENCE TO RELATED PATENT APPLICATION

This application claims priority from Korean Patent Application No. 10-2005-0081996, filed on Sep. 3, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to a semiconductor probe with a high resolution resistive tip and a method of fabricating the same, and more particularly, a semiconductor probe with a convex high-resolution tip, which has a diameter less than 100 nm, and a method of fabricating the semiconductor probe.

2. Description of the Related Art

As compact devices such as mobile communication terminals and electronic pocket notes become more popular, the demand for micro integrated nonvolatile recording media increases. It is not easy to miniaturize existing hard disks or to provide highly integrated flash memories. Therefore, information storage devices using scanning probe microscopy (SPM) have been studied as an alternative.

Probes are used in various SPM devices. For example, probes are used for a scanning tunneling microscope (STM) that detects current produced when a voltage is applied between a probe and a sample to reproduce information, an atomic force microscope (AFM) that uses an atomic force between a probe and a sample, a magnetic force microscope (MFM) that uses an interactive force between a magnetic field produced by a sample and a magnetized probe, a scanning near-field optical microscope (SNOM) that overcomes a resolution limitation due to the wavelength of visible light, and an electrostatic force microscope (EFM) that uses an electrostatic force between a sample and a probe.

In order to record and reproduce information at high speed and high density using the techniques of such SPM, a surface charge in a small area with a diameter of several tens of nanometers should be detected. Also, cantilevers should be arranged in an array to increase recording and reproduction speeds.

Figure 1:
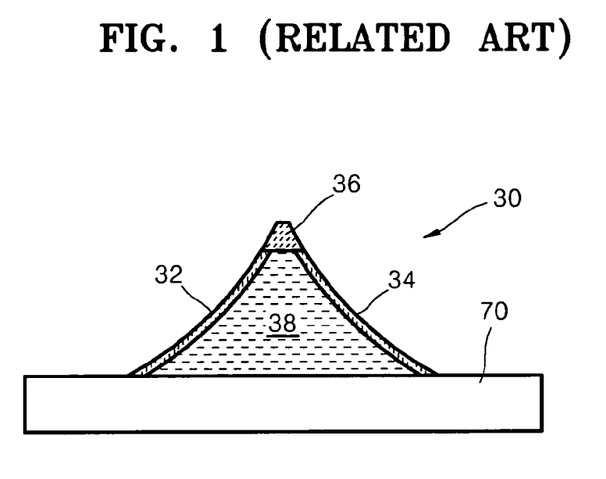
FIG. 1 is a cross-sectional view of a conventional semiconductor probe disclosed in International Patent Publication No. WO 03/096409.

FIG. 1 is a cross-sectional view of a conventional cantilever 70 on which a resistive tip 30 is formed disclosed in International Patent Publication No. WO 03/096409. The resistive tip 30 is perpendicular to the cantilever 70 and has a resistive region 36 with a diameter of several tens of nanometers. The cantilever 70 can be fabricated in the form of an array.

Referring to FIG. 1, the resistive tip 30 of the semiconductor probe includes a body 38 doped with a first impurity, the resistive region 36 disposed at a peak of the tip 30 and lightly doped with a second impurity, and first and second semiconductor electrode regions 32 and 34 formed on inclined surfaces of the tip 30 and heavily doped with the second impurity. The resistive region 36 is disposed between ends of the first and second semiconductor electrode regions 32 and 34.

However, the conventional semiconductor probe with the resistive tip 30 has a disadvantage in that the first and second semiconductor electrode regions 32 and 34 formed on the inclined surfaces of the resistive tip 30 are excessively wet-etched during a process of forming the resistive tip 30, thereby reducing the areas of the heavily doped inclined surfaces. Conductive areas on the inclined surfaces are accordingly reduced, thereby degrading the spatial resolution of the resistive region 36. Also, the probe may be damaged when ions are implanted at a high energy of 300 keV in the fabricating process. Further, the probe may be damaged when a thermal diffusion process, that is, an annealing process, is performed at a temperature of 1000° C. for a long time, e.g., 12 hours. In addition, a thermal oxidation process is performed at a temperature of 1000° C. under an oxygen atmosphere for 30 to 40 minutes to sharpen the resistive tip 30.

SUMMARY OF THE INVENTION

The present invention provides a semiconductor probe with a high-resolution resistive tip.

The present invention provides a method of fabricating a semiconductor probe with a high-resolution resistive tip through low-energy ion implantation without an excessive annealing process.

According to an aspect of the present invention, there is provided a semiconductor probe with a high-resolution tip, the semiconductor probe comprising: a cantilever doped with a first impurity; a resistive convex portion projecting from an end portion of the cantilever and lightly doped with a second impurity opposite in polarity to the first impurity; and first and second electrode regions formed on either side of the resistive convex portion and heavily doped with the second impurity.

The resistive convex portion may have a square pillar shape.

The resistive convex portion may have a width of less than 100 nm.

The resistive convex portion may have a width ranging from 14 to 50 nm.

According to another aspect of the present invention, there is provided a semiconductor probe with a high-resolution tip, the semiconductor probe comprising: a cantilever doped with a first impurity; a resistive convex portion lightly doped with a second impurity opposite in polarity to the first impurity and projecting from an end portion of the cantilever; and step-shaped first and second electrode regions formed on opposite sides of the resistive convex portion and heavily doped with the second impurity opposite in polarity to the first impurity.

According to still another aspect of the present invention, there is provided a method of fabricating a semiconductor probe with a high-resolution tip, the method comprising: forming a stripe-shaped mask layer on a top surface of a substrate that is doped with a first impurity; etching the substrate using the mask layer above the substrate as a mask to form a stripe-shaped projection portion in the substrate; heavily doping regions of the substrate, which are not covered by the mask layer, with a second impurity opposite in polarity to the first impurity; forming a stripe-shaped photoresist on the substrate perpendicular to the projection portion; etching the substrate including the projection portion using the photoresist as a mask to form a resistive convex portion with a square pillar shape and first and second semiconductor electrode regions on the substrate; and etching a bottom surface of the substrate to form a cantilever such that the resistive convex portion is located at an end portion of the cantilever.

According to yet another aspect of the present invention, there is provided a method of fabricating a semiconductor probe with a high-resolution tip, the method comprising: forming a stripe-shaped mask layer on a top surface of a substrate that is doped with a first impurity; etching the substrate using the mask layer as a mask to form a stripe-shaped first projection portion; etching the mask layer to reduce the width of the mask layer; heavily doping regions of the substrate which are not covered by the mask layer with a second impurity opposite in polarity to the first impurity; etching the substrate including the first projection portion using the mask layer as a mask to form a stripe-shaped second projection portion and a step-shaped substrate; forming a stripe-shaped photoresist perpendicular to the second projection portion on the substrate; etching the substrate including the second projection portion using the photoresist as a mask to form a resistive convex portion with a square pillar shape and step-shaped first and second electrode regions on opposite sides of the resistive convex portion; and etching a bottom surface of the substrate to form a cantilever such that the resistive convex portion is located at an end portion of the cantilever.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE INVENTION

The present invention will now be described more fully with reference to the accompanying drawings, in which exemplary embodiments of the invention are shown. The thicknesses of layers or regions illustrated in the drawings are exaggerated for clarity.

Figure 2:
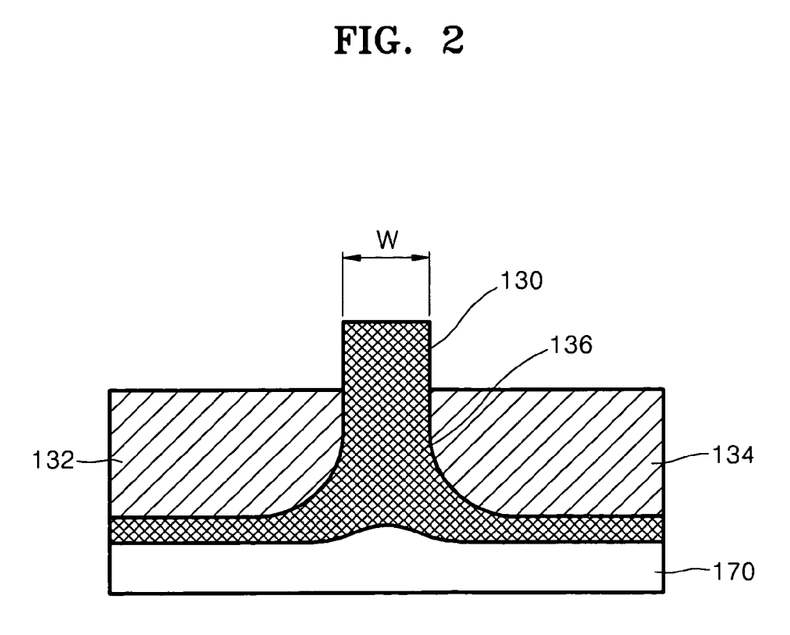
FIG. 2 is a cross-sectional view of a tip portion of a semiconductor probe with a high-resolution tip according to an exemplary embodiment of the present invention.

FIG. 2 is a cross-sectional view of a tip portion of a semiconductor probe with a high-resolution tip according to an exemplary embodiment of the present invention.

Referring to FIG. 2, a resistive convex portion 130 perpendicularly projects from an end portion of a cantilever 170 that is doped with a first impurity. The resistive convex portion 130 may have a square pillar shape. The resistive convex portion 130 is a resistive region 136 lightly doped with a second impurity opposite in polarity to the first impurity. A first electrode region 132 and a second electrode region 134 heavily doped with the second impurity are formed on both sides of the resistive convex portion 130. A resistive region 136 including the resistive convex portion 130 between the first and second electrode regions 132 and 134 may be doped in a process of implanting ions into the first and second electrode regions 132 and 134. The first impurity may be a p-type impurity and the second impurity may be an n-type impurity.

The width W of the resistive convex portion 130 may be equal to the width of a mask during a fabricating process. For example, if the width W of the resistive convex portion 130 is 100 nm, ions can be implanted at a low energy of 10 keV to form the first and second electrode regions 132 and 134, thereby preventing the semiconductor probe from being damaged during the ion implantation. Also, since the first and second electrode regions 132 and 134, which act as conductors, are formed on both sides of the resistive convex portion 130, the resolution of the resistive convex portion 130 is not reduced, leading to an increase in the resolution of the semiconductor probe.

The width W of the resistive convex portion 130 may be less than 100 nm to ensure high resolution, and may range, for example, from 14 to 50 nm. When arsenic is implanted at an energy of 10 keV, it is known that a projected range, which is a depth at which the implanted arsenic reaches its maximum concentration, is approximately 10 nm, and 30 to 40% of the projected range is implanted horizontally inside the ion implantation mask. Accordingly, to form the resistive region 136 after the ion implantation and an activation annealing process, the minimal width of the convex portion 130 may be greater than 1.4 times the projected range, e.g., 14 nm.

An electric field produced by a surface charge 137 of a recording medium 133 (see FIG. 3) is blocked by the regions other than the resistive convex portion 130, that is, the conductive first and second electrode regions 132 and 134. Accordingly, the electric field produced by the surface charge 137 of the recording medium 133 causes the difference in the resistance of the resistive convex portion 130. The polarity and density of the surface charge 137 can be accurately detected from this difference in the resistance.

Figure 3:
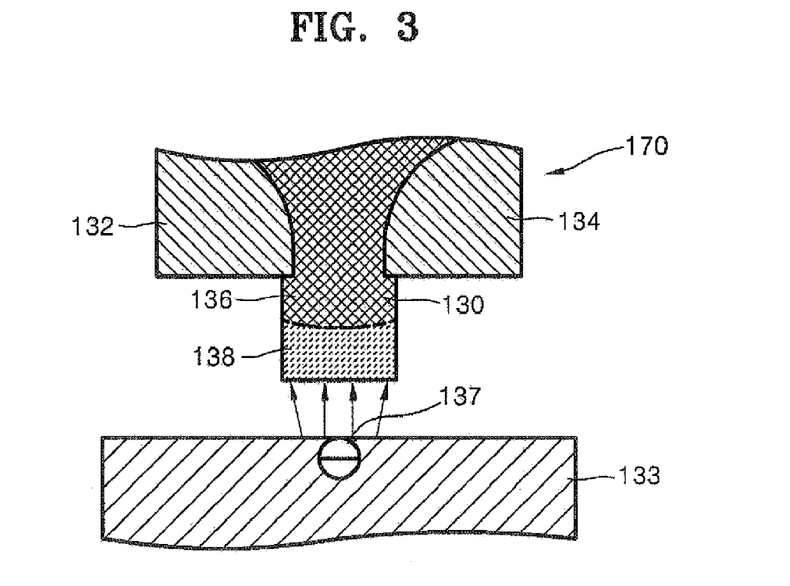
FIG. 3 is an enlarged view of a peak of the tip of the semiconductor probe of FIG. 2.

FIG. 3 is an enlarged view of the peak of the resistive tip of the semiconductor probe of FIG. 2.

The operation of the semiconductor probe with the high-resolution resistive tip will be explained with reference to FIG. 3.

Referring to FIG. 3, even if the depletion region 138 of the resistive convex portion 130 does not expand to the first and second semiconductor electrode regions 132 and 134, the area of the resistive region 136 is reduced by the depletion region 138, which is a non-conductor, thereby varying the resistance of the resistive region 136. Accordingly, the polarity and density of the surface charge 137 of the recording medium 133 can be detected using the variation in the resistance. The depletion region 138 formed in the resistive region 136 is extended toward the first and second semiconductor electrode regions 132 and 134 due to an electric field produced by the negative surface charge 137. Since the resistive convex portion 130 is separated from the electrode regions 132 and 134 that act as conductors, the spatial resolution of the resistive convex portion 130 is improved.

FIGS. 4A through 4H are perspective views illustrating a method of fabricating the semiconductor probe with the high-resolution tip of FIG. 2 according to an exemplary embodiment of the present invention.

Figure 4A:
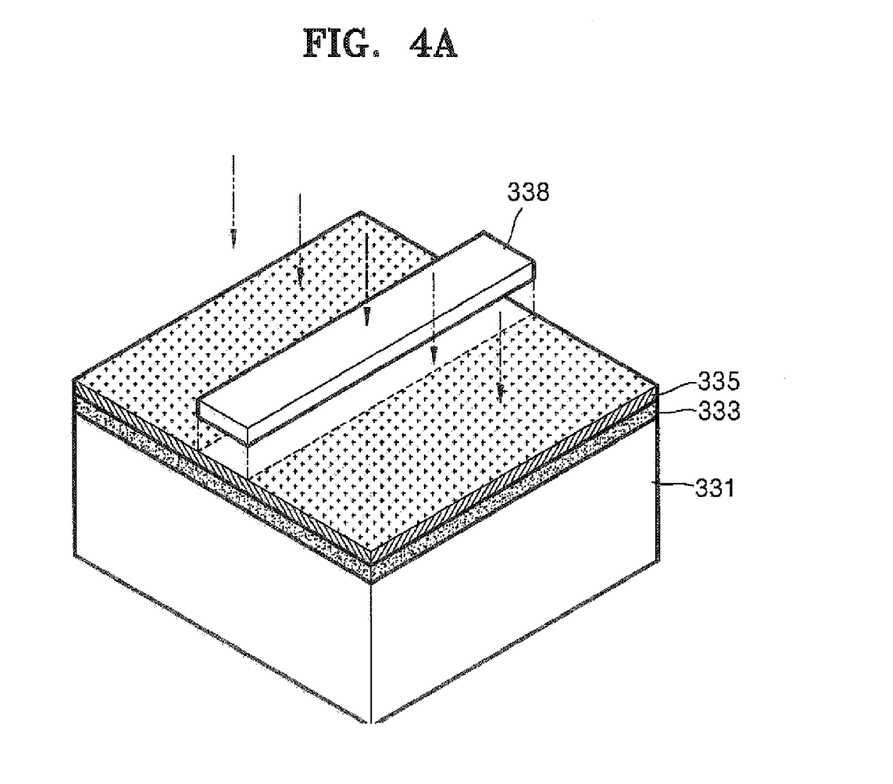
FIGS. 4A through 4H are perspective views illustrating a method of fabricating the semiconductor probe with the high-resolution tip of FIG. 2 according to an exemplary embodiment of the present invention.

Referring to FIG. 4A, a mask layer 333, such as a silicon oxide layer or a silicon nitride layer, is formed on a silicon substrate 331 doped with a first impurity, a photoresist 335 is coated on the mask layer 333, and a stripe-shaped mask 338 is disposed over the photoresist 335.

Figure 4B:
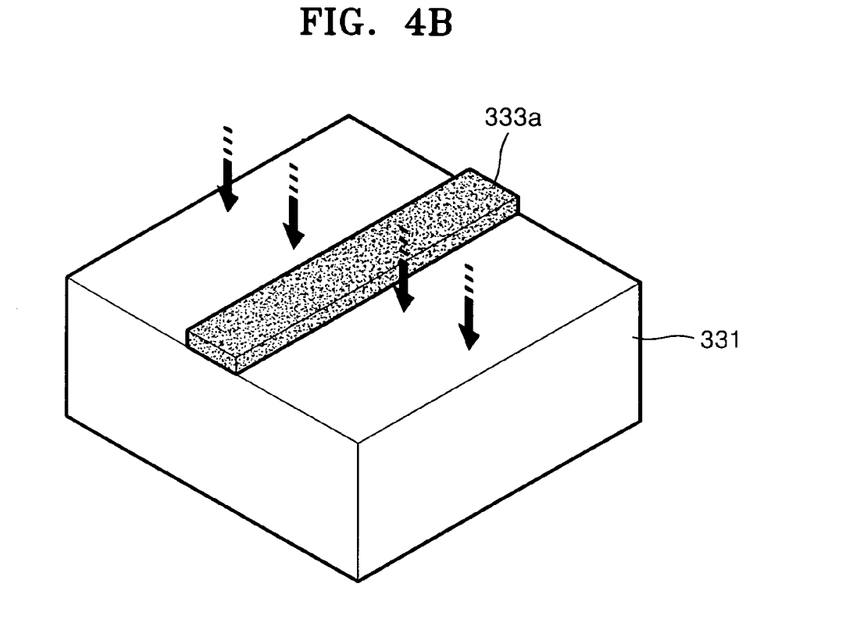

Referring to FIG. 4B, the resultant structure is exposed, developed, and etched to form a stripe-shaped mask layer 333a on the substrate 331. The width of the mask layer 333 may be less than 100 nm. For example, the width of the mask layer may range from 14 to 50 nm.

Figure 4C:
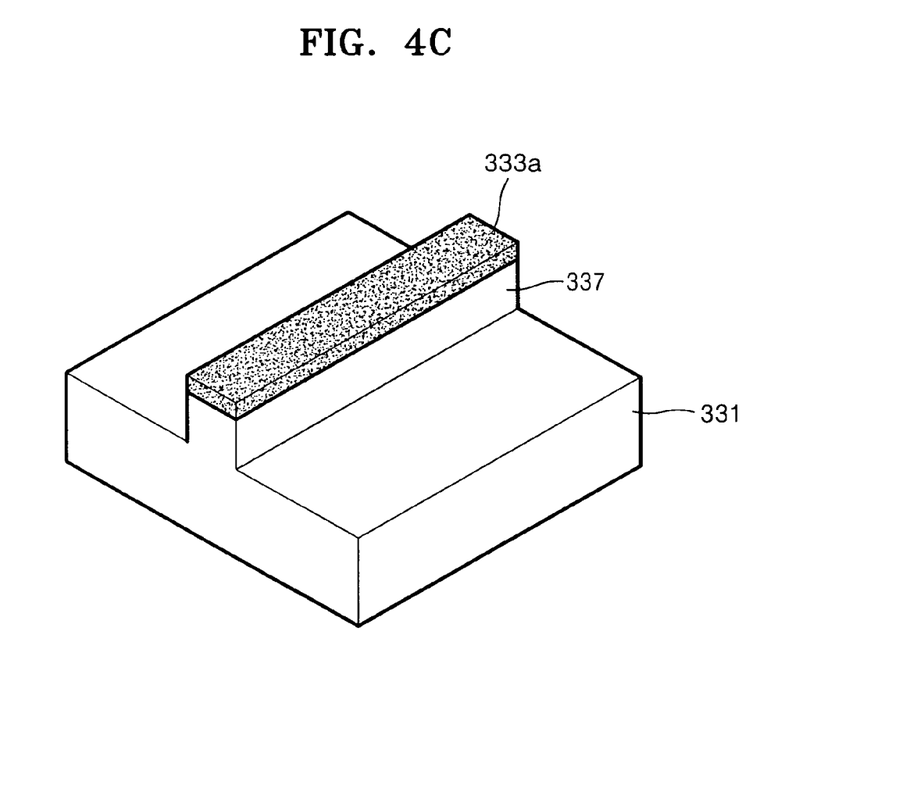

Referring to FIG. 4C, the substrate 331 is dry etched to a depth of less than 100 nm from the mask layer 333a. A stripe-shaped projection portion 337 is formed on the substrate 331.

Figure 4D:
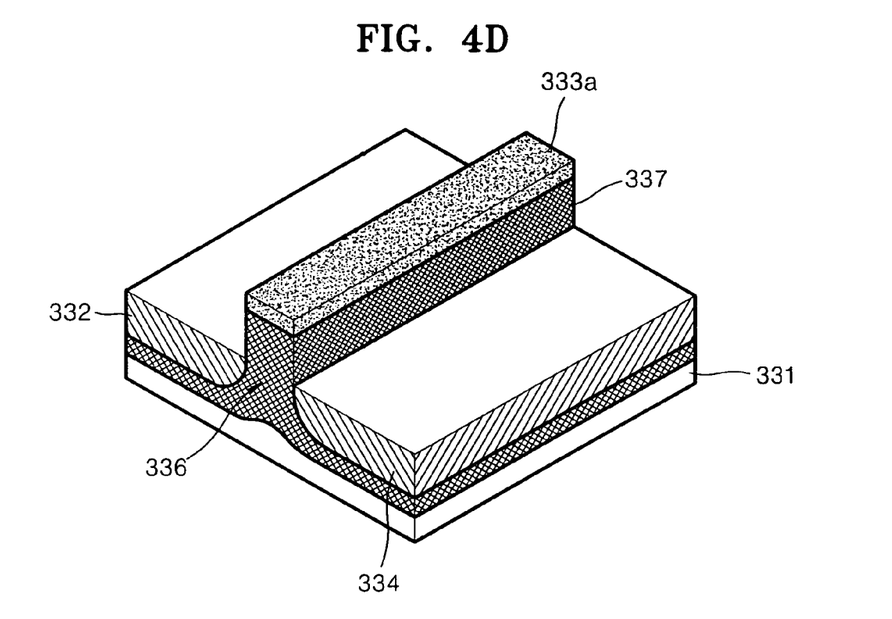

Referring to FIG. 4D, the resultant structure is heavily doped with a second impurity using the mask layer 333a as a mask to form first and second semiconductor electrode regions 332 and 334. At this time, ions can be implanted at a low energy of approximately 10 keV since the first and second electrode regions 332 and 334 formed on both sides of the resistive convex portion will not be etched, and thus can be formed to have low depths. Also, since the width of the mask layer 333a is narrow, a resistive region 336 can be easily formed between the first and second semiconductor electrode regions 332 and 334 through ion implantation and a short thermal diffusion process. The resistivity of the first and second semiconductor electrode regions 332 and 334 is sufficiently low that they can serve as conductors. Next, the mask layer 333a is removed, and a rapid thermal annealing (RTA) is performed on the substrate 331 to activate the implanted ions. The RTA process is performed at a temperature of 1000° C. for several minutes.

Figure 4E:
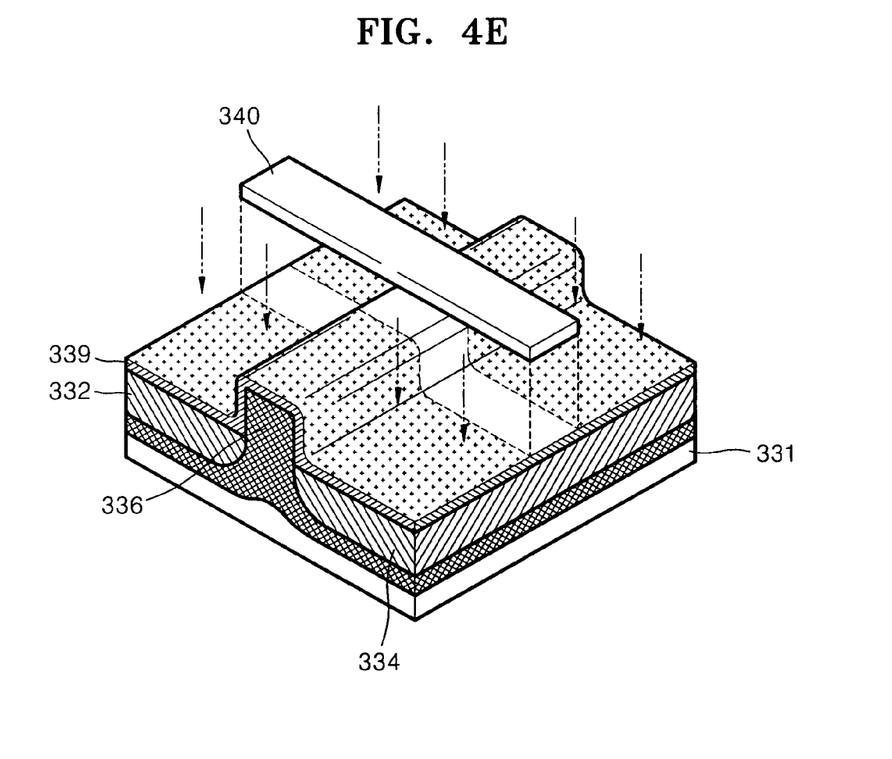

Referring to FIG. 4E, a photoresist 339 is coated on a top surface of the substrate 331, and a stripe-shaped photomask 340 is disposed over the photoresist 339, perpendicular to the etched mask layer 333a.

Figure 4F:
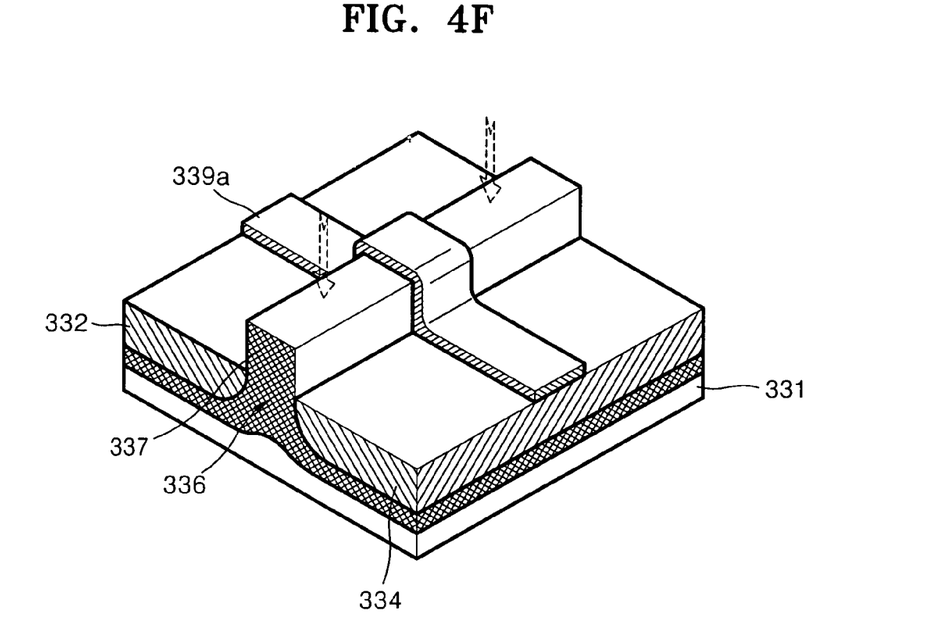

Referring to FIG. 4F, the photoresist 339 is exposed, developed, and etched to form a photoresist layer 339a with the same shape as the photomask 340.

Figure 4G:
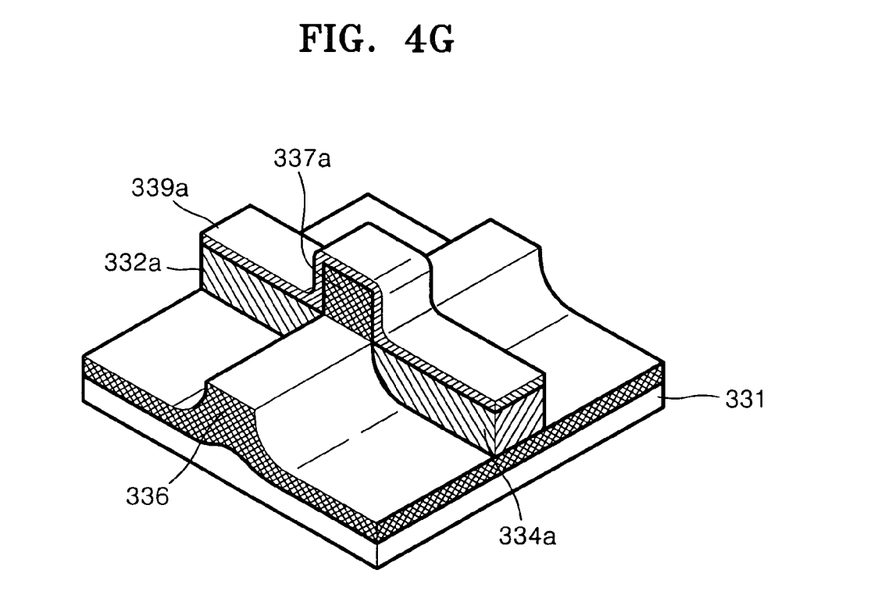

Referring to FIG. 4G, the projection portion 337 is etched using the stripe-shaped photoresist layer 339a as a mask to form a resistive convex portion 337a. The substrate 331 not covered by the photoresist layer 339a is etched.

Figure 4H:
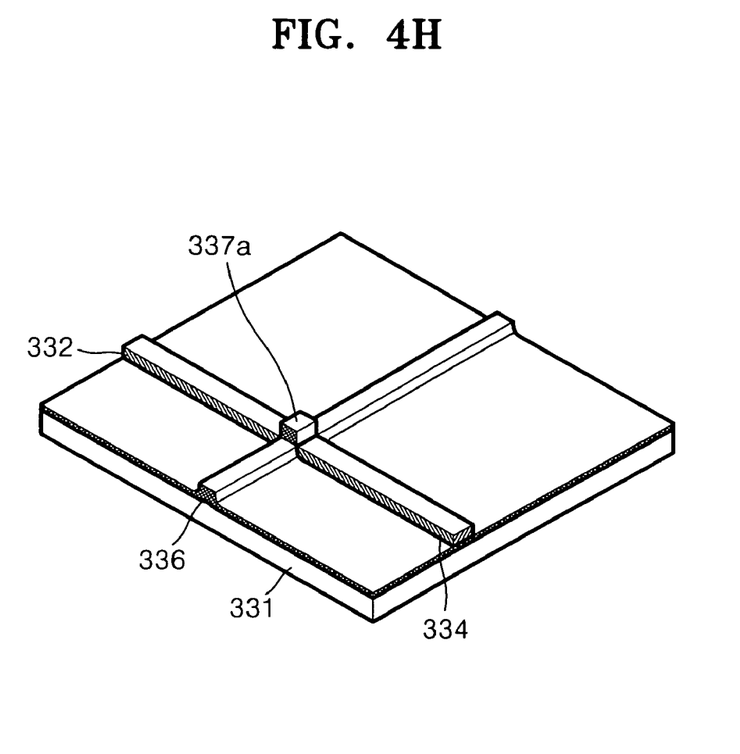

Referring to FIG. 4H, the photoresist layer 339a is removed from the substrate 331 to form the resistive convex portion 337a with a square pillar shape on the substrate 331. The first and second semiconductor electrode regions 332 and 334 are formed on opposite sides of the resistive convex portion 337a.

Next, a bottom surface of the substrate 331 is etched to form a cantilever (not shown) so that the resistive convex portion 337a is disposed at an end portion of the cantilever. Electronic pads (not shown) are respectively connected to the first and second semiconductor electrode regions 332 and 334. This cantilever forming process is well known, and thus a detailed description thereof will not be given.

Figure 5:
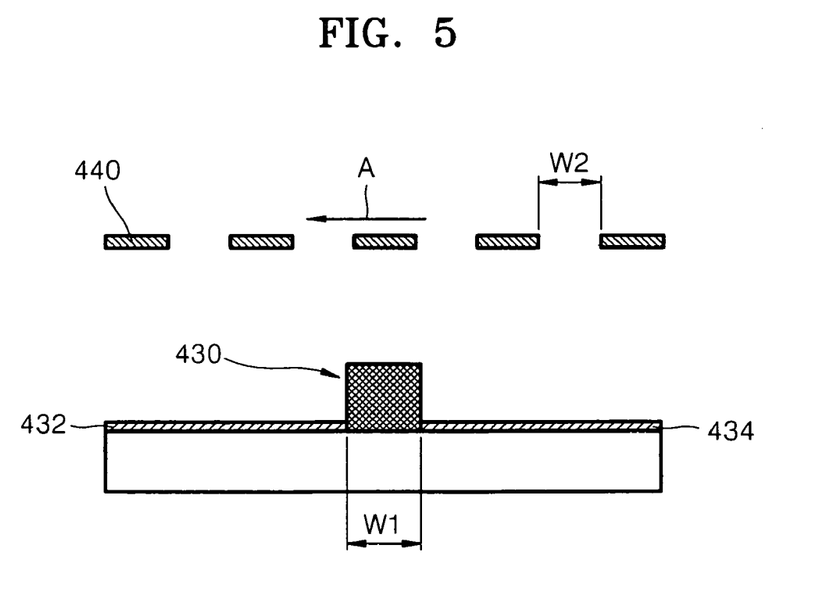
FIG. 5 is a cross-sectional view of a probe used in a simulation to measure the resolution of a semiconductor probe with a high-resolution tip according to an exemplary embodiment of the present invention.
Figure 6:
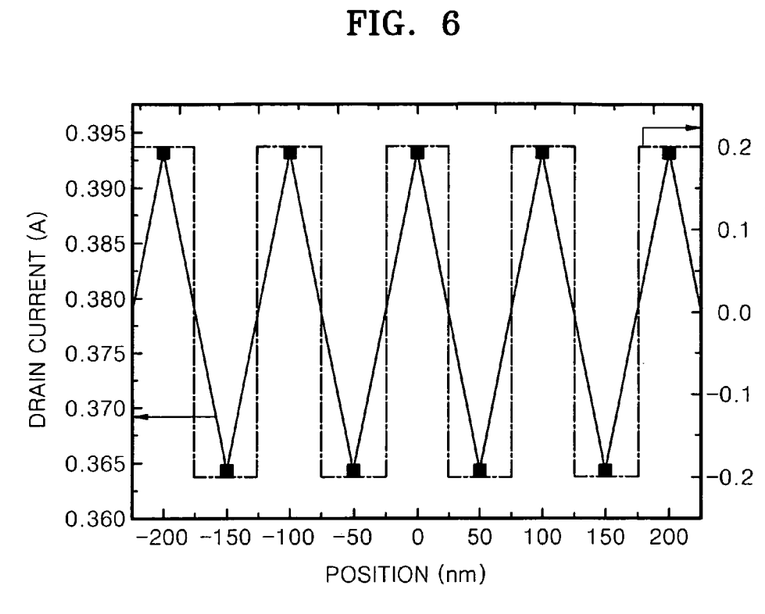
FIG. 6 is a graph illustrating a drain current of the probe of FIG. 5 according to a charge variation.

FIG. 5 is a cross-sectional view of a probe used in a simulation to measure the resolution of a semiconductor probe with a high-resolution tip according to an exemplary embodiment of the present invention. FIG. 6 is a graph illustrating a drain current of the probe of FIG. 5 according to a charge variation.

Referring to FIGS. 5 and 6, source and drain electrodes 432 and 434 were formed on either side of a convex portion 430, and floating gate electrodes 440 were formed above the convex portion 430. Referring to FIG. 6, voltages of +0.2 V and −0.2 V were alternately applied to the floating gate electrodes 440 as the width W1 of the convex portion 430 and the width W2 between adjacent floating gate electrodes 440 were changed. A drain current of the convex portion 430 was measured as the floating gate electrodes 440 were moved in a direction indicated by an arrow A. Referring to FIG. 6, when the width W1 of the convex portion 430 was 50 nm and the width W2 between the adjacent floating gate electrodes 440 was 50 nm, the resolution was 50 nm. Whereas when the width W1 of the convex portion 430 was 30 nm and the width W2 between the adjacent flowing gate electrodes 440 was 50 nm, the resolution was 20 nm. Accordingly, the convex portion 430 according to the present exemplary embodiment is superior in resolution to a conventional resistive tip of a probe which has a resolution of hundreds of nanometers. This is because the width of the convex portion 430 is only tens of nanometers and the conductors are disposed on either side of the convex portion 430.

Figure 7:
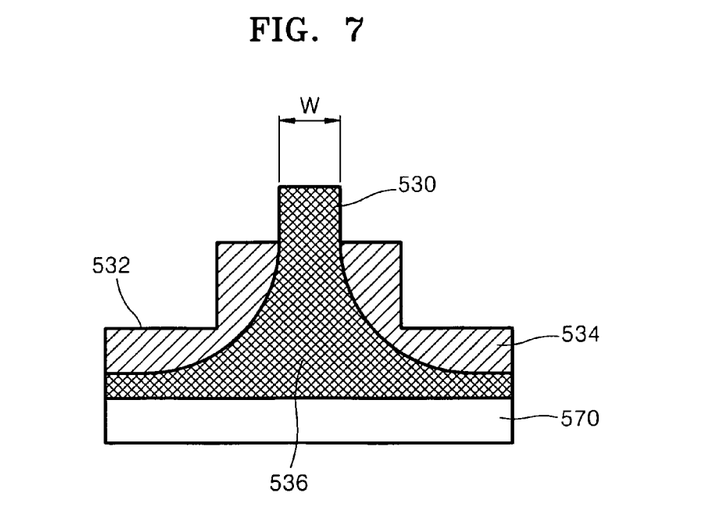
FIG. 7 is a cross-sectional view of a tip portion of a semiconductor probe with a high-resolution tip according to another exemplary embodiment of the present invention.

FIG. 7 is a cross-sectional view of a tip portion of a semiconductor probe with a high-resolution tip according to another exemplary embodiment of the present invention.

Referring to FIG. 7, a resistive convex portion 530 projects from an end portion of a cantilever 570 that is doped with a first impurity. Step-shaped first and second electrode regions 532 and 534 heavily doped with a second impurity are formed on either side of the resistive convex portion 530. A resistive region 536 lightly doped with the second impurity is formed between the first and second semiconductor electrode regions 532 and 534. The resistive region 536 may be formed during ion implantation. The first impurity may be a p-type impurity and the second impurity may be an n-type impurity.

The width W of a peak of the resistive convex portion 530 may be equal to the width of a mask used in a fabricating process. If the width W of the resistive convex portion 530 is 50 nm, ions can be implanted at a low energy of 10 keV to form the first and second semiconductor electrode regions 532 and 534, thereby preventing the probe from being damaged during the ion implantation. Also, since both sides of the resistive convex portion 530 and the first and second semiconductor electrode regions 532 and 534 are heavily doped conductive regions, the resolution of the resistive region 536 formed at the peak of the resistive convex portion 530 is not reduced, thereby increasing the resolution of the probe. The electrode regions 532 and 534 and both sides of the resistive convex portion 530 block an electric field produced by the surface charge 137 of the recording medium 133 (see FIG. 3) from affecting the first and second semiconductor electrode regions 532 and 534. Accordingly, the electric field produced by the surface charge 137 of the recording medium 133 causes a difference in a resistance of the resistive convex portion 530. The polarity and density of the surface charge 137 can be accurately detected from this difference in the resistance.

The resistive convex portion 530 projecting from the cantilever 570 illustrated in FIG. 7 may have a greater height than the resistive convex portion 130 illustrated in FIG. 2. Accordingly, a distance between the recording medium 133 and the first and second semiconductor electrode regions 532 and 534 increases, and thus the influence of a recording medium charge on other regions than the resistive region 536 is reduced to increase resolution.

FIGS. 8A through 8E are cross-sectional views illustrating a method of fabricating the semiconductor probe with the high-resolution tip of FIG. 7 according to an exemplary embodiment of the present invention.

Figure 8A:
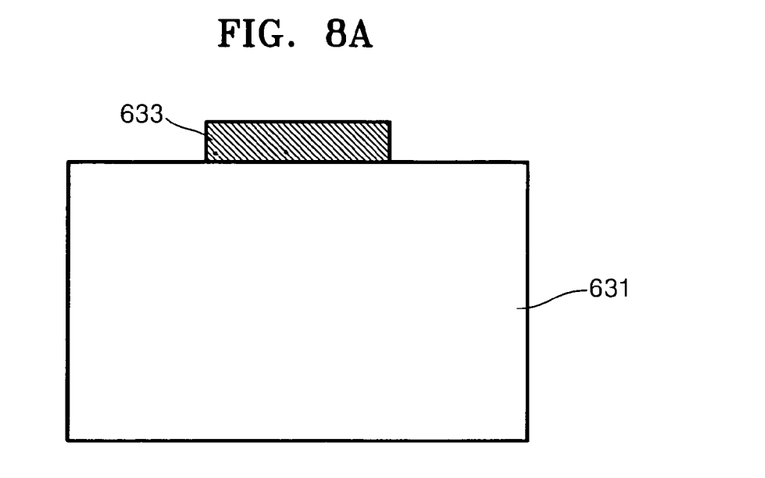
FIGS. 8A through 8E are cross-sectional views illustrating a method of fabricating the semiconductor probe with the high-resolution tip of FIG. 7 according to an exemplary embodiment of the present invention.

Referring to FIG. 8A, a stripe-shaped mask layer 633 is formed on a silicon substrate 631 doped with a first impurity.

Figure 8B:
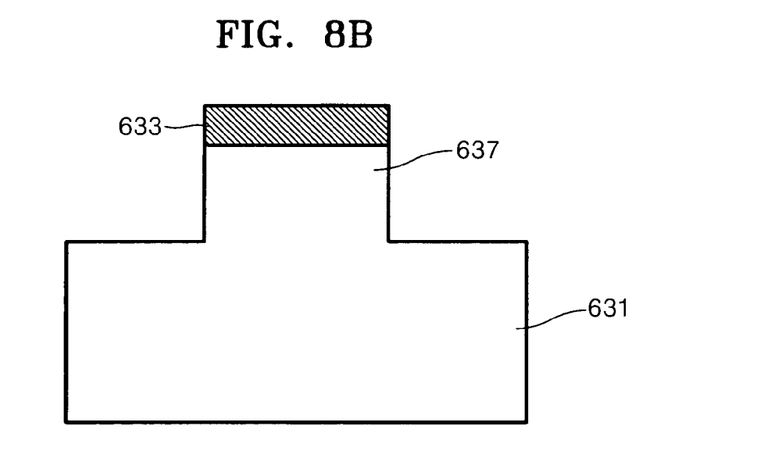

Referring to FIG. 8B, the substrate 631 is dry etched using the mask layer 633 as a mask to form a stripe-shaped first projection portion 637.

Figure 8C:
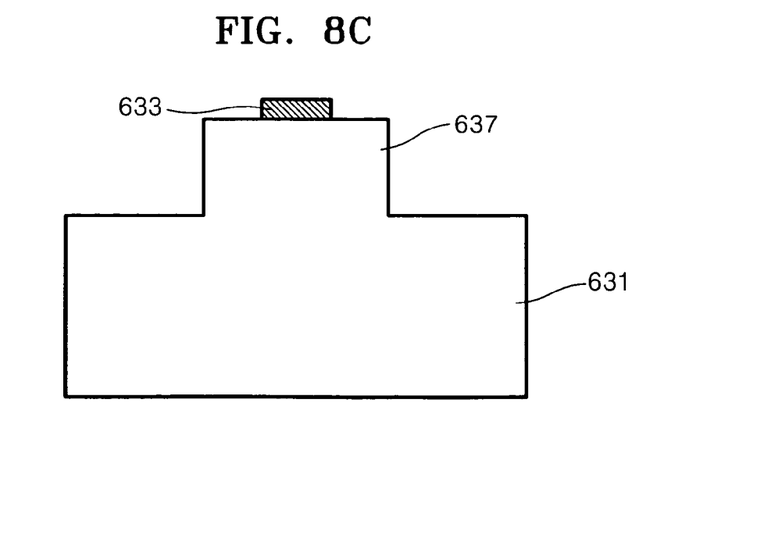

Referring to FIG. 8C, the mask layer 633 is etched for a predetermined period of time to reduce the width of the mask layer 633. The width of the mask layer 633 may be reduced by half.

Figure 8D:
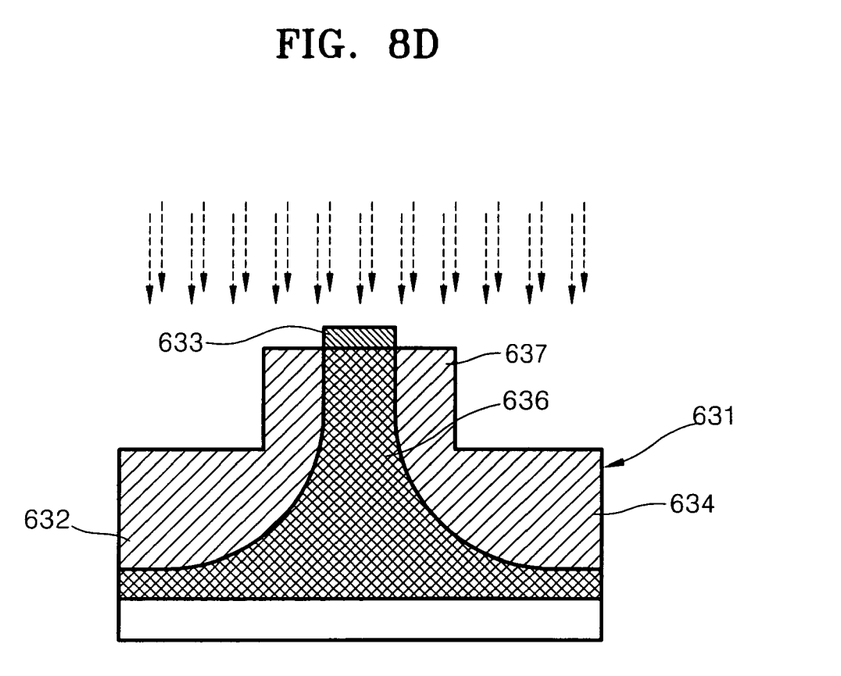

Referring to FIG. 8D, a second impurity is heavily doped into the resultant structure using the mask layer 633 as a mask. At this time, ions can be implanted at a low energy of 10 keV. Since the width of the mask layer 633 is narrow, a resistive region 636 can be easily formed between heavily doped regions 632 and 634 during the ion implantation. Next, an RTA process is performed on the substrate 631 to activate the implanted ions. The RTA process is performed at a temperature of 1000° C. for several minutes.

Figure 8E:
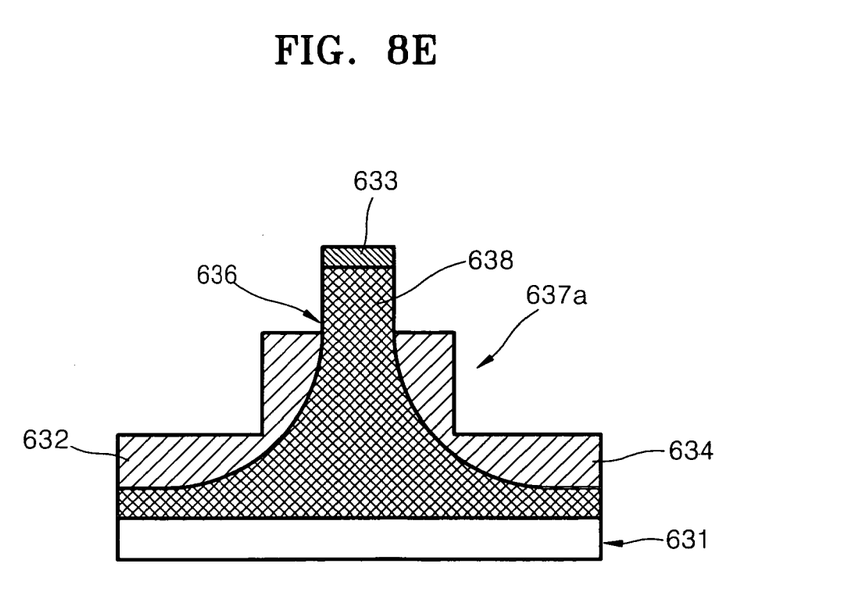

Referring to FIG. 8E, the substrate 631 is dry etched from the mask layer 633, such that a stripe-shaped second projection portion 638 and the step-shaped heavily doped regions 632 and 634 are formed. Next, the mask layer 633 is removed, and the second projection portion 638 is etched to have a square pillar shape, thereby completing the resistive convex portion 130 (see FIG. 2). An explanation of subsequent processes will not be given as those processes are the same as the processes of FIGS. 4E through 4H.

As described above, since conductive regions are formed on both sides of the resistive convex portion that is formed at the peak of the resistive tip, the resolution of the resistive convex portion can be enhanced. Also, since the resistive convex portion has a diameter of several tens of nanometers, the resolution of the probe can be enhanced.

Furthermore, since ions are implanted at a low energy, damage to the probe can be prevented. Moreover, since a time consuming ion diffusion process which is difficult to control is not required, a desired probe can be easily fabricated.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A semiconductor probe with a high-resolution tip, the semiconductor probe comprising:
   a cantilever doped with a first impurity;
   a resistive convex portion projecting from an end portion of the cantilever and lightly doped with a second impurity opposite in polarity to the first impurity; and
   first and second electrode regions formed on either side of the resistive convex portion and heavily doped with the second impurity,
   wherein the first and second electrode regions are formed substantially horizontally, and the resistive convex portion is substantially vertically protruded with respect to the first and second electrode regions.

2. The semiconductor probe of claim 1, wherein the resistive convex portion has a diameter of less than 100 nm.

3. The semiconductor probe of claim 2, wherein the resistive convex portion has a diameter ranging from 14 to 50 nm.

4. A semiconductor probe with a high-resolution tip, the semiconductor probe comprising:
   a cantilever doped with a first impurity;
   a resistive convex portion projecting from an end portion of the cantilever and lightly doped with a second impurity opposite in polarity to the first impurity; and
   first and second electrode regions formed on either side of the resistive convex portion and heavily doped with the second impurity,
   wherein the resistive convex portion is doped lighter than the first and second electrode regions, and
   wherein the resistive convex portion has a square pillar shape.

5. A semiconductor probe with a high-resolution tip, the semiconductor probe comprising:
   a cantilever doped with a first impurity;
   a resistive convex portion lightly doped with a second impurity opposite in polarity to the first impurity and projecting from an end portion of the cantilever; and
   step-shaped first and second electrode regions formed on either side of the resistive convex portion and heavily doped with the second impurity opposite in polarity to the first impurity.

6. The semiconductor probe of claim 5, wherein the resistive convex portion has a square pillar shape.

7. The semiconductor probe of claim 6, wherein the resistive convex portion has a diameter ranging from 14 to 50 nm.

8. The semiconductor probe of claim 5, wherein the resistive convex portion has a diameter of less than 100 nm.

* * * * *